United States Patent
Atkin et al.

(10) Patent No.: US 12,175,463 B2
(45) Date of Patent: Dec. 24, 2024

(54) COMPUTER TRANSACTION ENTITY AUTHENTICATION

(71) Applicant: International Business Machines Corporation, Armonk, NY (US)

(72) Inventors: Steven Edward Atkin, Austin, TX (US); Alisha Moore, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 17/449,016

(22) Filed: Sep. 27, 2021

(65) Prior Publication Data
US 2023/0100394 A1    Mar. 30, 2023

(51) Int. Cl.
    *H04L 29/06*   (2006.01)
    *G06F 21/31*   (2013.01)
    *G06F 21/45*   (2013.01)
    *G06F 21/60*   (2013.01)
    *G06F 21/62*   (2013.01)
    *G06Q 20/40*   (2012.01)
    *H04L 9/40*    (2022.01)

(52) U.S. Cl.
    CPC ......... *G06Q 20/401* (2013.01); *G06F 21/31* (2013.01); *G06F 21/45* (2013.01); *G06F 21/604* (2013.01); *G06F 21/62* (2013.01); *H04L 63/10* (2013.01); *H04L 63/101* (2013.01)

(58) Field of Classification Search
    CPC .......... G06F 21/31; G06F 21/45; G06F 21/62
    See application file for complete search history.

(56) References Cited

U.S. PATENT DOCUMENTS

| | | | | |
|---|---|---|---|---|
| 8,584,219 | B1 * | 11/2013 | Toole | H04L 69/24 726/25 |
| 9,152,775 | B1 * | 10/2015 | Kronrod | G06F 21/31 |
| 10,038,689 | B1 * | 7/2018 | Chan | H04L 63/107 |
| 2008/0184351 | A1 * | 7/2008 | Gephart | H04L 63/08 726/7 |
| 2012/0214442 | A1 * | 8/2012 | Crawford | G06F 21/316 455/411 |
| 2015/0193781 | A1 * | 7/2015 | Dave | H04L 63/0807 705/318 |
| 2016/0328794 | A1 * | 11/2016 | Schrump | G06Q 40/02 |
| 2017/0317993 | A1 * | 11/2017 | Weber | H04L 63/08 |

(Continued)

FOREIGN PATENT DOCUMENTS

RU    2738337 C1    12/2020

OTHER PUBLICATIONS

Rovetta et al., "Bot recognition in a Web store: an approach based on unsupervised learning," Elsevier, Journal of Network and Computer Applications 157, Feb. 2020, 15 pages, https://doi.org/10.1016/j.jnca.2020.102577.

(Continued)

*Primary Examiner* — Jason K Gee
(74) *Attorney, Agent, or Firm* — Eric W. Chesley

(57) ABSTRACT

A resource request that is directed to a first online resource of a resource provider is detect by a computing device. A first user that initiated the resource request is identified based on the resource request. A set of challenge questions is determined in response to the resource request and based on the first user. A first challenge question of the set of challenge questions is present, to a first client device of the first user.

17 Claims, 5 Drawing Sheets

(56) References Cited

U.S. PATENT DOCUMENTS

2020/0151347 A1\* 5/2020 Zheng .................... G06F 40/30
2020/0311250 A1\* 10/2020 Sandstrom ............. G06F 21/36
2020/0336496 A1 10/2020 Modalavalasa et al.

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

\* cited by examiner

COMPUTER TRANSACTION ENTITY AUTHENTICATION

BACKGROUND

The present disclosure relates to computer security, and more specifically, to authenticating online transactions.

Online transactions may occur between an online service provider and users seeking online services. Online transactions may be very convenient for users, as user may be able to transmit data across networks to distant computers as compared to traveling to a store or place of business of a service provider. Online transactions may be a target of nefarious behavior.

SUMMARY

According to embodiments, disclosed are a method, system, and computer program product.

A resource request that is directed to a first online resource of a resource provider is detect by a computing device. A first user that initiated the resource request is identified based on the resource request. A set of challenge questions is determined in response to the resource request and based on the first user. A first challenge question of the set of challenge questions is present, to a first client device of the first user.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
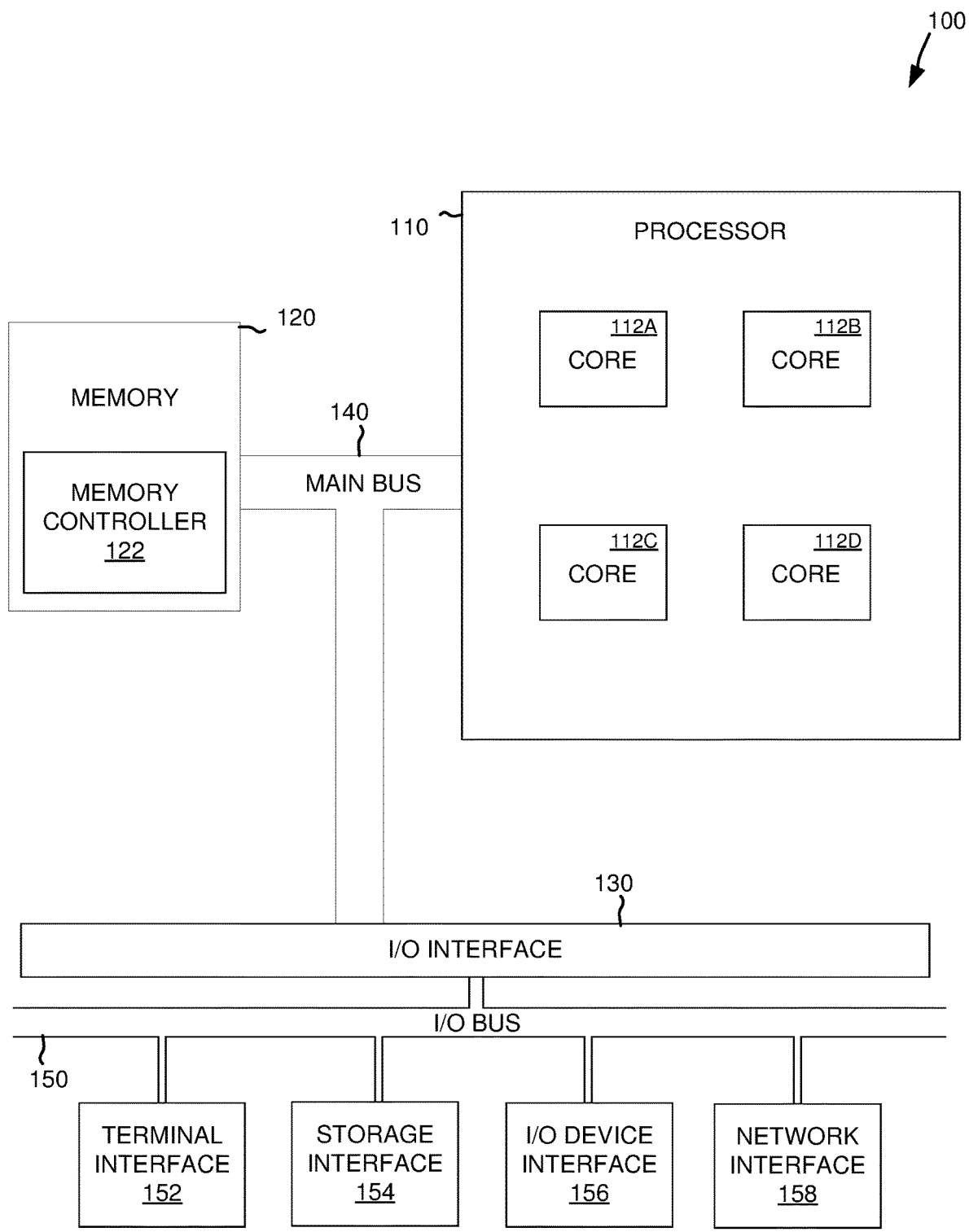
FIG. 1 depicts the representative major components of an example computer system that may be used, in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer security; more particular aspects relate to authenticating online transactions. While the present disclosure is not necessarily limited to such applications, various aspects of the disclosure may be appreciated through a discussion of various examples using this context.

Online providers of resources ("resources providers") may facilitate increased commerce with end users ("users"). For instance, users may navigate to an online site of a resource provider, such as a website or online software app that is connected to the Internet, to access resources. Resources may include products and services. For example, a resource may be physical goods such as clothing or electronic devices that are sold through an online storefront of a resource provider. In another example, a resource may be a digital copy of software, or access to view a streaming video. Online purchasing from resource providers has become a dominant manner in which to conduct certain functions of commerce. Specifically, end users may not have the time or necessary transportation to go to stores or meet with providers in person. Consequently, the Internet-connected software and websites of resource providers, have increasingly become a default option for many.

Purchasing of products and services online may have associated drawbacks, such as nefarious or fraudulent activity from malicious actors. For example, malicious actors may use technology to access services of resource providers with stolen credentials of other users. The stolen credentials may be a credit card or other payment method. It may be difficult for a user to detect that a credential is stolen, as the information related to stolen credentials may be surreptitiously stolen or traded online (e.g., through the Internet) by many malicious actors. Consequently, resource providers and users may spend large amounts of time trying to track and reverse-engineer fraudulent transactions after they happen.

Another nefarious action by malicious actors is the use of technology to limit or completely prevent access to online resources. Specifically, malicious actors may implement software and/or hardware (e.g., dedicated tools or programs) that perform automated checkout and purchase operations ("bots"). Bots may be configured to perform the necessary operations to fill out purchase information that is presented by a resource provider that is trying to sell goods and services. The user of bots may make it difficult for average consumers to go about normal life, as users now predominantly chose to make purchases from resource providers. For example, bots may be employed to limit the supply of many desirable products from users, such as event tickets and children's toys. Moreover, bots may make it difficult for users to purchase necessary household items, such as masks, gloves, sanitizer, as well as some medications. This issue may be compounded with acute real-world events, such as pandemics and natural disasters. During these times of stress on a supply chain, bots may prevent users from performing normal functions of life. For example, users may have to use a third-party reselling site just to purchase necessary household items, and the products may be significantly marked up. Often the malicious actors are the ones that benefit from a large markup on the third-party reselling site.

Existing solutions may not stop the malicious activity. Specifically, resource providers have attempted to mitigate bots or other fraudulent online transactions in various ways, to limited effectiveness. For example, resource providers may attempt to prevent transactions based on fixed criteria, such as an internet protocol ("IP") address. These fixed criteria may be easily averted by a malicious actor, such as by routing traffic through other IP addresses. In another example, resource providers may attempt to track the client devices of end users, such as using tracking cookies and/or third-party scoring systems. These tracking and scoring systems may be of limited value in that malicious parties may be able to spoof or confuse the tracking and scoring systems. Some tracking and scoring systems rely on a set of vetted or verified email addresses, and many nefarious businesses have cropped up to create and provide email addresses that are not flagged by the tracking systems. In yet another example, resource providers may attempt to perform a test by requesting a user to enter in characters that are displayed in a skewed, warped, or distorted fashion in an image, such as a Completely Automated Public Turing test to tell Computers and Humans Apart ("CAPTCHA"). Increasingly, bots may be configured to solve CAPTCHA and other questions through a combination of OCR and/or machine learning technology.

Computer transaction entity authentication ("CTEA") may overcome drawbacks in securing online transactions with resource providers. A CTEA may operate to detect malicious activity based on the parameters of the transaction. The CTEA may also operate to prevent a malicious transaction by generating multiple security challenges and presenting security challenges in multiple manners. The CTEA may operate without providing the same challenge question ("question") responsive to all transactions. The CTEA may operate without providing the same set of challenge questions repeatedly. The CTEA may also operate without providing the same challenge questions to each entity. The CTEA may operate by not providing challenge questions with a fixed length of time for waiting for a response.

In some embodiments, the CTEA may be configured to receive, from a user, a request for an online purchase, wherein the request comprises purchase details and a delivery location. Further the CTEA may determine a question and answer based on the delivery location. The questions may not be directed at the specifics of the type or text of the delivery location. The questions may be directed to information about the location, or information about other locations that are spatially near the location, or information about events that are temporal to the delivery and/or delivery location. Upon being presented to the user by the CTEA, the questions may be difficult for a party other than the user to answer or determine, and consequently, malicious transactions may be prevented.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may include a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may include a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may include an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
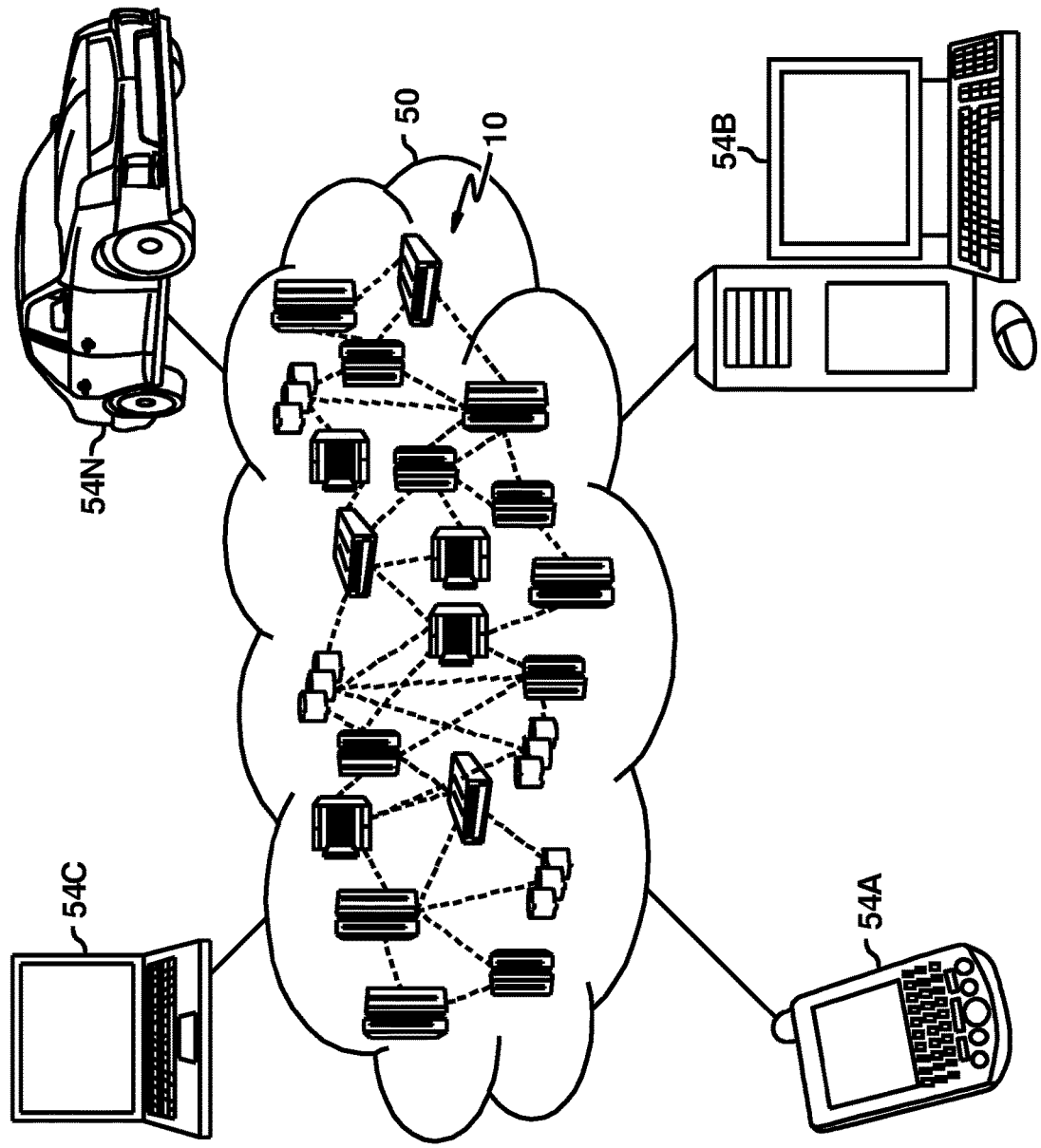
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
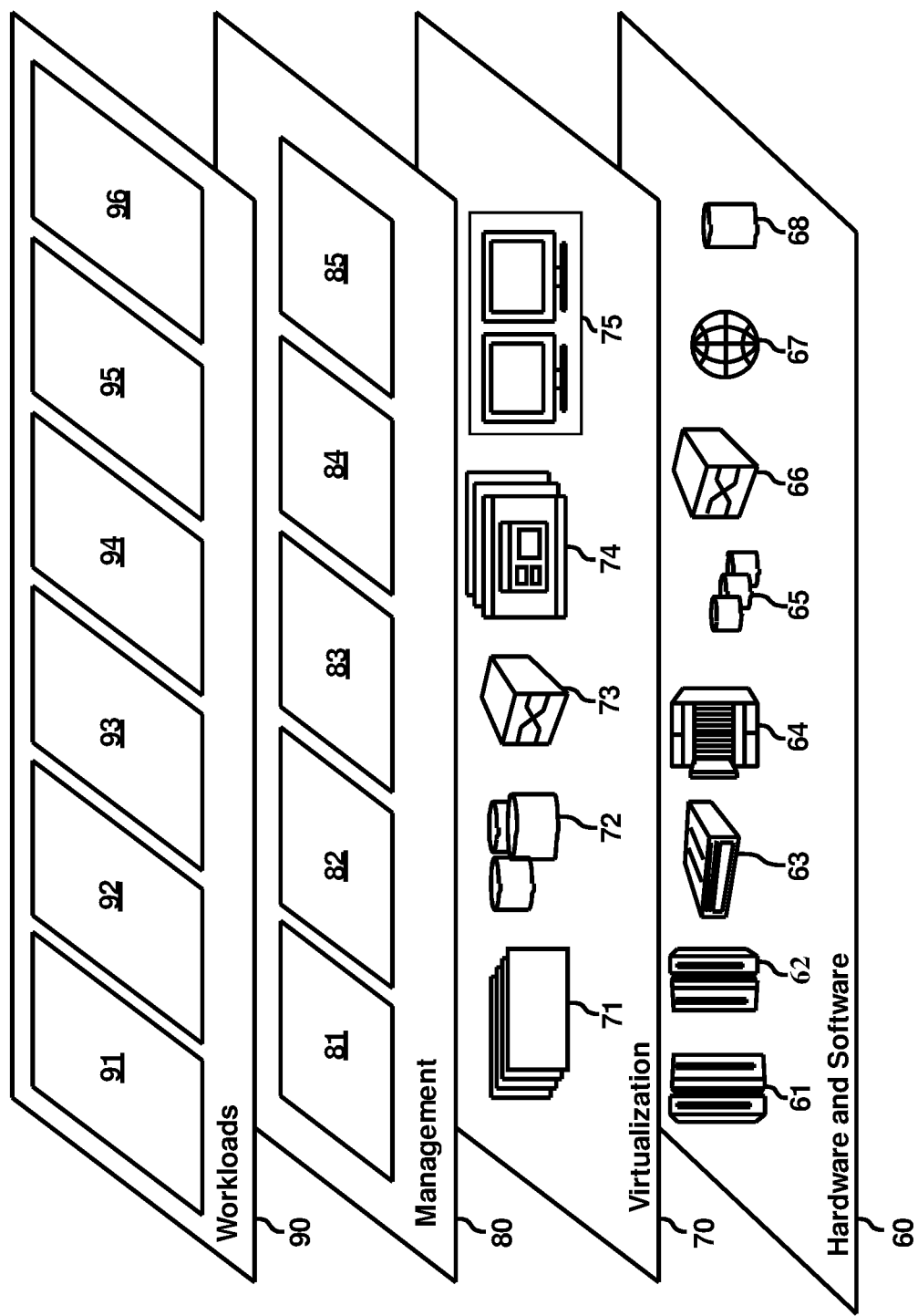
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and CTEA 96.

Figure 4:
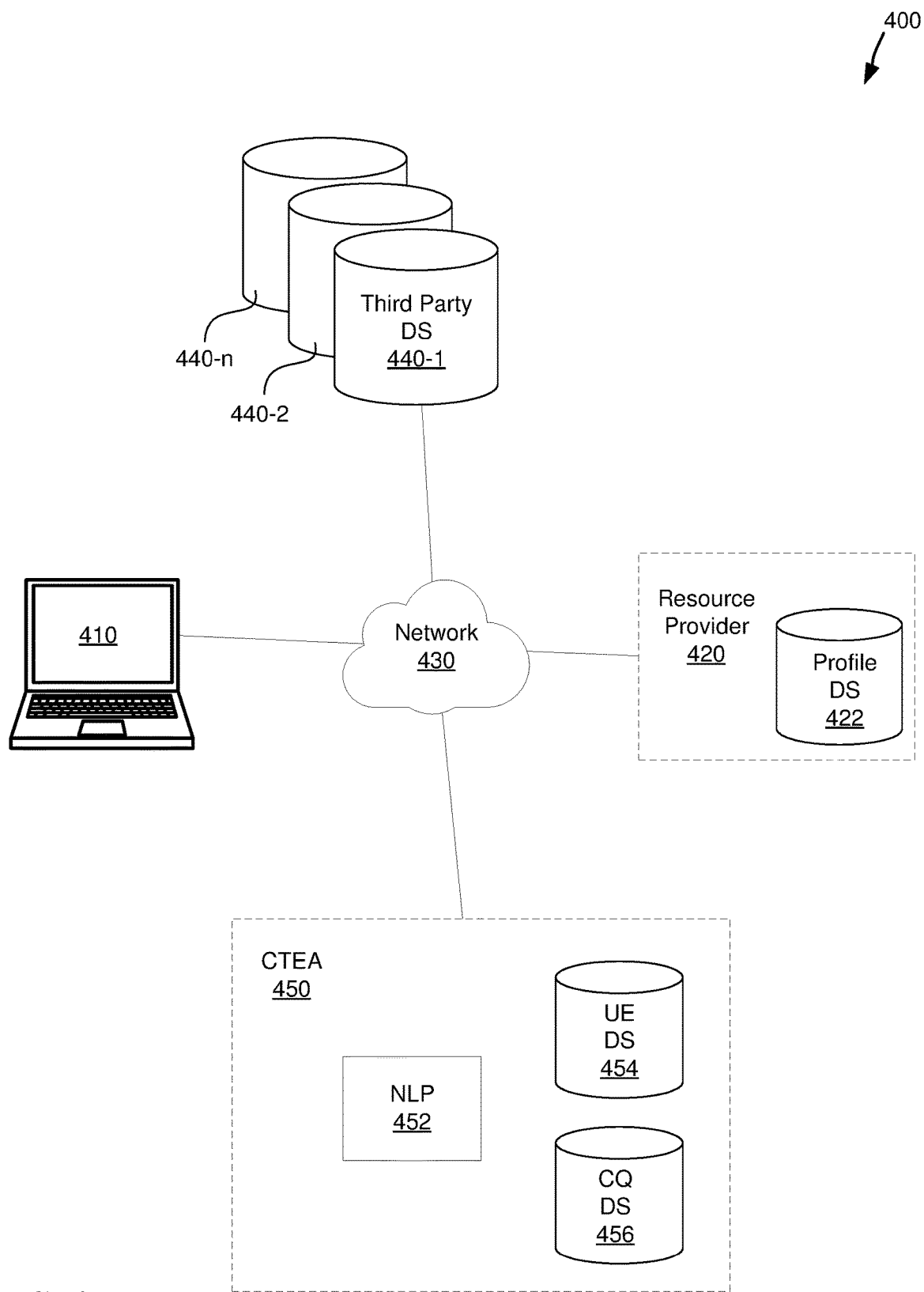
FIG. 4 depicts an example system configured to authenticate transactions of resource providers, consistent with some embodiments of the disclosure.

FIG. 4 depicts an example system 400 configured to authenticate transactions of resource providers, consistent with some embodiments of the disclosure. System 400 may operate by providing challenge questions to client devices. Specifically, system 400 may include the following: at least one client device 410; at least one resource provider 420; a network 430 to facilitate communication; one or more third party datastores ("TPDSs") 440-1, 440-2, up to 440-n (collectively, TDPSs 440); and a CTEA 450. System 400 may be configured to operate responsively to a transaction for various goods and services, such as during a purchase, cart, checkout, or other relevant online transaction. Though system 400 may depict a single client device 410 and a single resource provider 420, one of skill in the art would appreciate that system 400 contemplates other arrangements of the client device and resource providers. For example, CTEA 450 may be configured to scale and authenticate hundreds or thousands of client devices and a similar number of resource providers.

Client device 410 may be a computer system configured to perform online transactions. In some embodiments, client device 410 may be a laptop computer, as depicted in FIG. 4. In some embodiments, client device 410 may be a smartphone, desktop PC, tablet computer, smart watch, or other relevant computer system. For example, client device 410 may be embodied as computer 100 of FIG. 1. In operation, client device 410 may include software and/or hardware to facilitate the initiation of online transactions. For example, client device 410 may include a modem or other relevant networking technology and may communicate with other elements of system 400 through network 430. A user may input one or more credentials (e.g., a credit card, a username, a password) into software executing on client device 410 (e.g., a web browser, an app), to initiate an online transaction for purchasing a good or service from resource provider 420.

Resource provider 420 may be a computer system configured to perform online transactions. For example, resource provider 420 may be an online shopping portal configured to respond to requests for resources from various client devices, such as client device 410. In some embodiments, resource provider 420 may be a single computer, such as a laptop or desktop PC, a server computer, or other relevant computer system. For example, resource provider 420 may be embodied as computer 100 of FIG. 1. In some embodiments, resource provider 420 may be multiple computers operating in an abstracted manner that appear to client devices as a single computer system. For example, resource provider 420 may be embodied as a part, portion, or subsystem of executing on one or more cloud computing nodes 10 of cloud computing environment 50. Resource provider 420 may communicate with other elements of system 400 through network 430.

Resource provider 420 may include a user profile datastore 422, to facilitate creation, storage, and retrieval of various credentials of users. Profile datastore 422 may include one or more databases, files, or other relevant computing constructs. Resource provider 420 may upon receiving a request for a transaction (e.g., a purchase request of an article of clothing, an access request to a streaming audio service), utilize profile datastore 422 to validate a request. Specifically, resource provider 420 may operate by verifying information provided from client devices with information stored in profile datastore 422. For example, client device 410 may provide a username and password to resource provider 420, and resource provider 420 may compare the provided username and password with a stored username and password in the profile datastore 422.

Network 430 may be a communications network, configured to send and receive data from the client device 410, the resource provider 420, the TPDSs 440, and the CTEA 450. Network 430 can be implemented using any number of any suitable physical and/or logical communications topologies. The network 430 can include one or more private or public computing networks. For example, network 430 may comprise a private network (e.g., a network with a firewall that blocks non-authorized external access) that is associated with a particular function or workload (e.g., communication, streaming, hosting, sharing), or set of software or hardware clients. Alternatively, or additionally, network 430 may comprise a public network, such as the Internet. Consequently, network 430 may form part of a data unit network (e.g., packet-based)—for instance, a local-area network, a wide-area network, and/or a global network.

Network 430 can include one or more servers, networks, or databases, and can use one or more communication protocols to transfer data between other components of system 400. Furthermore, although illustrated in FIG. 4 as a single entity, in other examples network 430 may comprise a plurality of networks, such as a combination of public and/or private networks. The communications network 430 can include a variety of types of physical communication channels or "links." The links can be wired, wireless, optical, and/or any other suitable media. In addition, the communications network 430 can include a variety of network hardware and software (not depicted) for performing routing, switching, and other functions; the hardware/software may include routers, switches, base stations, bridges, or any other equipment that may be useful to facilitate communicating data.

TPDSs 440 may be a set of one or more datastores that are configured to store information regarding users of client devices, such as client device 410. The TPDSs 440 may include one or more databases, files, or other relevant computing constructs. The TPDSs 440 may be owned, operated, or otherwise in control of a relevant third party. For example, TPDS 440-1 may be a department of motor vehicles database that includes vehicle and registration information of users, including a user of client device 410. In another example, TPDS 440-2 may include county records stored on a secure server by the county and include records regarding real property entries, such as landmarks, buildings, registration information and the like. In some embodiments, the TPDSs 440 may include datastores of resource providers. For example, a second resource provider (not depicted) may operate TPDS 440-2 and may include records such as prior purchases or transaction from client devices, such as client device 410. In some embodiments, the TPDSs 440 may include geographically relevant information, such as weather conditions, road conditions, names of venues, business listings, store names and categories, and the like. In some embodiments, the TPDSs 440 may include time-based relevant information, such as traffic status during the past twenty-four hours, road-work status for the recent week, event history for the past week at a particular venue, and the like.

CTEA 450 may be configured to validate attempts to perform transactions. CTEA 450 may include one or more of the following: a natural language processor 452, an untrusted entity datastore 454, and a challenge question datastore 456. CTEA 450 may operate as software hardware, or in some combination. In some embodiments, CTEA 450 may be a single computer, such as computer 100. In some embodiments, CTEA 450 may operate as a part of an abstracted set of computing resources, such as being provided by hardware that forms a part of cloud computing environment 50. In some embodiments, CTEA 450 may be embedded in a portion of one or more components of system 400. For example, CTEA 450 may be a daemon, job, utility, and/or program that is a part of one or more resource providers, such as resource provider 420. In another example, CTEA 450 may be a daemon, job, utility, and/or program that is a part of one or more client devices, such as client device 410. In some embodiments, CTEA 450 may operate separately from other components of system 400. For example, one or more computers or computing resources that are separate or are not a part of a client device and/or a resource provider may host CTEA 450. CTEA 450 may include one or more permissions, authorizations, profiles, logins, accounts, or other relevant credentials to access other components of the system 400. For example, CTEA 450 may have credentials that permit access to data stored in TPDSs 440 and resource provider 420.

In some embodiments, CTEA 450 may execute machine learning on data using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

The NLP 452 may be a computer module (e.g., hardware, software) that analyses the received content and other information. The NLP 452 may perform various methods and techniques for analyzing textual information (e.g., syntactic analysis, semantic analysis, etc.). The NLP 452 may be configured to recognize and analyze any number of natural languages. In some embodiments, the NLP 452 may parse passages of documents or content from information stored in the Profile DS 422 and the TPDSs 440. Various components (not depicted) of the NLP 452 may include, but are not limited to, a tokenizer, a part-of-speech (POS) tagger, a semantic relationship identifier, and a syntactic relationship identifier. The NLP 452 may include a support vector machine (SVM) generator to process the content of topics found within a corpus and classify the topics.

In some embodiments, the tokenizer may be a computer module that performs lexical analyses. The tokenizer may convert a sequence of characters into a sequence of tokens. A token may be a string of characters included in an electronic document and categorized as a meaningful symbol. Further, in some embodiments, the tokenizer may identify word boundaries in an electronic document and break any text passages within the document into their component text elements, such as words, multiword tokens, numbers, and punctuation marks. In some embodiments, the tokenizer may receive a string of characters, identify the lexemes in the string, and categorize them into tokens.

Consistent with various embodiments, the POS tagger may be a computer module that marks up a word in passages to correspond to a particular part of speech. The POS tagger may read a passage or other text in natural language and assign a part of speech to each word or other token. The POS tagger may determine the part of speech to which a word (or other text element) corresponds based on the definition of the word and the context of the word. The context of a word may be based on its relationship with adjacent and related words in a phrase, sentence, or paragraph.

In some embodiments, the context of a word may be dependent on one or more previously analyzed electronic documents (e.g., property records of a user, transaction records from previous transactions). Examples of parts of speech that may be assigned to words include, but are not limited to, nouns, verbs, adjectives, adverbs, and the like. Examples of other part of speech categories that POS tagger may assign include, but are not limited to, comparative or superlative adverbs, wh-adverbs, conjunctions, determiners, negative particles, possessive markers, prepositions, wh-pronouns, and the like. In some embodiments, the POS tagger may tag or otherwise annotate tokens of a passage with part of speech categories. In some embodiments, the POS tagger may tag tokens or words of a passage to be parsed by the NLP 452.

In some embodiments, the semantic relationship identifier may be a computer module that may be configured to identify semantic relationships of recognized text elements (e.g., words, phrases) in documents. In some embodiments, the semantic relationship identifier may determine functional dependencies between entities and other semantic relationships.

Consistent with various embodiments, the syntactic relationship identifier may be a computer module that may be configured to identify syntactic relationships in a passage composed of tokens. The syntactic relationship identifier may determine the grammatical structure of sentences such as, for example, which groups of words are associated as phrases and which word is the subject or object of a verb. The syntactic relationship identifier may conform to formal grammar.

In some embodiments, the NLP 452 may be a computer module that may parse a document and generate corresponding data structures for one or more portions of the document. For example, in response to receiving an instruction to parse documents by the CTEA 450, the NLP 452 may output parsed text elements from the data. In some embodiments, a parsed text element may be represented in the form of a parse tree or other graph structure. To generate the parsed text element, the NLP 452 may trigger computer modules including the tokenizer, the part-of-speech (POS) tagger, the SVM generator, the semantic relationship identifier, and the syntactic relationship identifier.

In some embodiments, the CTEA 450 may leverage one or more of the example machine learning techniques to perform machine-learning (ML) text operations. Specifically, CTEA 450 may operate to perform machine-learning text classification and/or a machine-learning text comparison on output from the NLP 452. Machine-learning text classification may include ML text operations to convert, characters, text, words, and phrases to numerical values. The numerical values may then be input into a neural network to determine various features, characteristics, and other information of words with respect to a document or in relation to other words (e.g., to classify a numerical value associated with a word may permit the classification of a word). Machine-learning text comparison may include using the numerical values of converted characters, text, words, and phrases for performing a comparison. The comparison may be a comparison of a numerical value of a first word or other text to the numerical value of a second word or other text. The determination of the machine-learning text comparison may be to determine a scoring, a correlation, or a relevant relationship (e.g., a relationship between a first numerical value of a first word and a second numerical value of a second word). The comparison may be used to determine if two words are similar or different based on one or more criteria. The numerical operations of a machine-learning text classification/comparison may be a function of a mathematical operation performed through a neural network, such as performing a linear regression, an addition, or other relevant mathematical operation of the numerical value representative of a word or other text.

The ML text operations may include word encoding, such as one-hot encoding of words from a tokenizer, POS tagger, semantic relationship identifier, syntactic relationship identifier, and the like. The ML text operations may include the use of vectorization of text, such as the vectorization of words from a tokenizer, POS tagger, semantic relationship identifier, syntactic relationship identifier, and the like. For example, a paragraph of text may include the phrase "automobile is registered as an orange sedan." Vectorization of the word "orange" may include setting input neurons of a neural network to the various words of the phrase including the word "orange." The output value may be an array of values (e.g., forty-eight numbers, thousands of numbers). The output values may trend towards "1" for related words and may trend towards "0" for unrelated words. The related words may be related based on one or more of the following: similar parts of speech, syntactical meaning, locality within a sentence or paragraph, or other relevant "closeness" between the input and other parts of natural language (e.g., other parts of the phrase "orange is a color of paint for automobiles", other parts of a paragraph that contains the phrase, other parts of language).

The untrusted entity datastore 454, and the challenge question datastore 456 may be databases, flat files, datastores, caches, or other relevant computer storage constructs.

The untrusted entity datastore 454 may include a plurality of entries that match known malicious actors, such as bots. For example, a first entry in the untrusted entity datastore 454 may include any of the following related to a known malicious transaction: timestamps of last attempts at transaction(s); name of a targeted resource provider; last-used IP address to attempt a transaction; list of combined items in a cart or checkout attempt; speed or rate at which various fields have been filled out. The CTEA 450 may compare new requests, such as a request from client 410, to the entries in the untrusted entity datastore 454 to try and identify a malicious request.

The challenge question datastore 456 may include a plurality of entries that include question stumps or partially completed questions. The challenge questions may have a predetermined difficulty or challenge level. In a first example, a first subset of questions may have a predefined "low" or "benign" ranking that is associated with a relatively low likelihood that a given request is a malicious request. Continuing the first example, the questions may relate to general or non-specific information. The general questions may include any of the following: a question to provide a characteristic (e.g., color, shape, size, item count) of an item that is a part of the request for a resource; a question to spell a roman numeral; a question to identify a subject in a presented image; a question to identify an alphanumeric character (or characters) in an image.

In a second example, a second subset of questions may have a predefined "medium" or "questionable" ranking that is associated with a relatively moderate likelihood that a given request is a malicious request. The moderate questions may include any of the following: a question to provide the current weather conditions at a particular address, a question to state whether a certain weather condition occurred at a particular address in the last 24-hours. The particular address may be an address that is provided as part of the request for the resource (e.g., a shipping or billing address), or an address on file that is associated with a user in the profile DS 422).

In a third example, a third subset of questions may have a predefined "high" or "likely" ranking that is associated with a relatively high likelihood that a given request is a malicious request. The high questions may include prompts for real or natural language. For example, the high questions may include any of the following: a question to state the name of a grocery store that is closest to the shipping address; a question to state the name of the color of an automobile registered at the billing address. The high questions may be coordinated with Global Positioning System ("GPS") data. For example, the CTEA 450 may request, from client 410 or another client device of the user associated with a user profile that initiated a transaction, GPS data for generating a question. A GPS-based question may include the following: a question to provide the name of the closest cross street to the current location of client device 410; a question to name the stadium that is closest to a location of the user that requested the resource.

The CTEA 450 may, in coordination with the NLP 452, generate answers to the questions that are stored in the challenge question datastore 456. In detail, the CTEA 450 may access information stored in the profile DS 422 and the TPDSs 440 that are related to the challenge questions and may then generate a list of acceptable answers. The answers may be generated before transaction attempts begin. For example, based on user profile information stored in profile DS 422, the CTEA 450 may retrieve one or more records that are stored in TPDSs 440, and NLP 452 may perform natural language processing on the records to determine acceptable answers. Continuing the example, given the question may be "what is the color of the car located at your shipping address?" that is directed to a first user. Information that lists vehicle registration in TPDSs 440-2 for the first user may include "first user: 1999 yellow convertible" and may be parsed to determine the value "yellow" for an automobile of the first user.

The CTEA 450 may be configured to identify if a request is related to a known bot or other known malicious traffic. In some embodiments, the CTEA 450 may leverage the untrusted entity datastore 454 to identify a malicious request. For example, the CTEA 450 may examine parameters of a particular request, such as a request by client 410 to resource provider 420, to identify a malicious request.

If a particular request does not match an entry in the untrusted entity datastore 454, the CTEA 450 may examine one or more parameters and may attempt to identify the request by scoring. In detail, one or more of the following operations may be performed before a request of a client, such as client 410, is completed and before a security question is presented to the client. Various factors may be identified from the profile DS 420 and/or the TPDSs 440, and these factors may include any of the following: Shipping and billing addresses of a profile associated with a given request are normalized into GPS coordinates and compared with GPS coordinates with prior purchases and/or registered locations and addresses. The payment method and issuing bank for payment associated with a profile of resource provider 420 are determined and compared with payment information of previous purchases with other resource providers. The IP address of a request is examined to see if it is coming from a proxy server. The version of the browser being used on the client device is determined and examination is made to see if it is a headless browser. The speed at which the billing address, the shipping address, name or other credentials are filled into forms of a provider, such as various shopping and service forms on resource provider 420. The speed at which the captcha is solved is recorded as part of a regular login operation on a resource provider.

The prior information may be used to calculate a risk score of a user that is operating a client device, such as client device 410. In some embodiments, the risk score may value each of the previous factors equally. For example, seven of the previously listed factors are used for generating a score. The score may be on a predetermined range between '0' and '7' for low to high risk. In some embodiments, the risk score may value each of the previous factors equally. For example, an address factor may have a value of '1' and a headless browser may have a value of '3' for generating a score, with a range between '1' and '10' for low to high risk.

Based on scoring a request, such as a request from client device 410, a differing question may be presented to the client. In a first example, a potential score from a client device could be between '1' and '15' and predetermined thresholds may include a low risk threshold of '1' to '4', a medium risk threshold of '5' to '9', and a high risk threshold of '10' to '15'. In a second example, a potential score from a client device could be between '1' and '10' and predetermined thresholds may include a benign risk threshold of '1' to '3', a questionable risk threshold of '4' to '6', and a likely risk threshold of '7' to '10'.

After scoring a request from a client, such as client 410, a particular question may be selected and presented to the client. The questions may be selected from the particular set or subset of questions that were previously generated. For example, a request that is scored as low risk, may be presented with a question from the low risk questions. Likewise, a medium risk scored client may be presented a medium risk question and a high risk scored client may be presented a high risk question. In some embodiments, the questions may be presented with differing times for permitting a response, such as higher risk scored clients may be given a shorter amount of time to respond to presented questions. For example, a low risk question may be presented to a client and the client may be given ten seconds for a response. In a second example, a medium risk question may be presented to a client and the client may be given six seconds for a response. In a third example, a high risk question may be presented to a client and the client may be given four seconds for a response.

Figure 5:
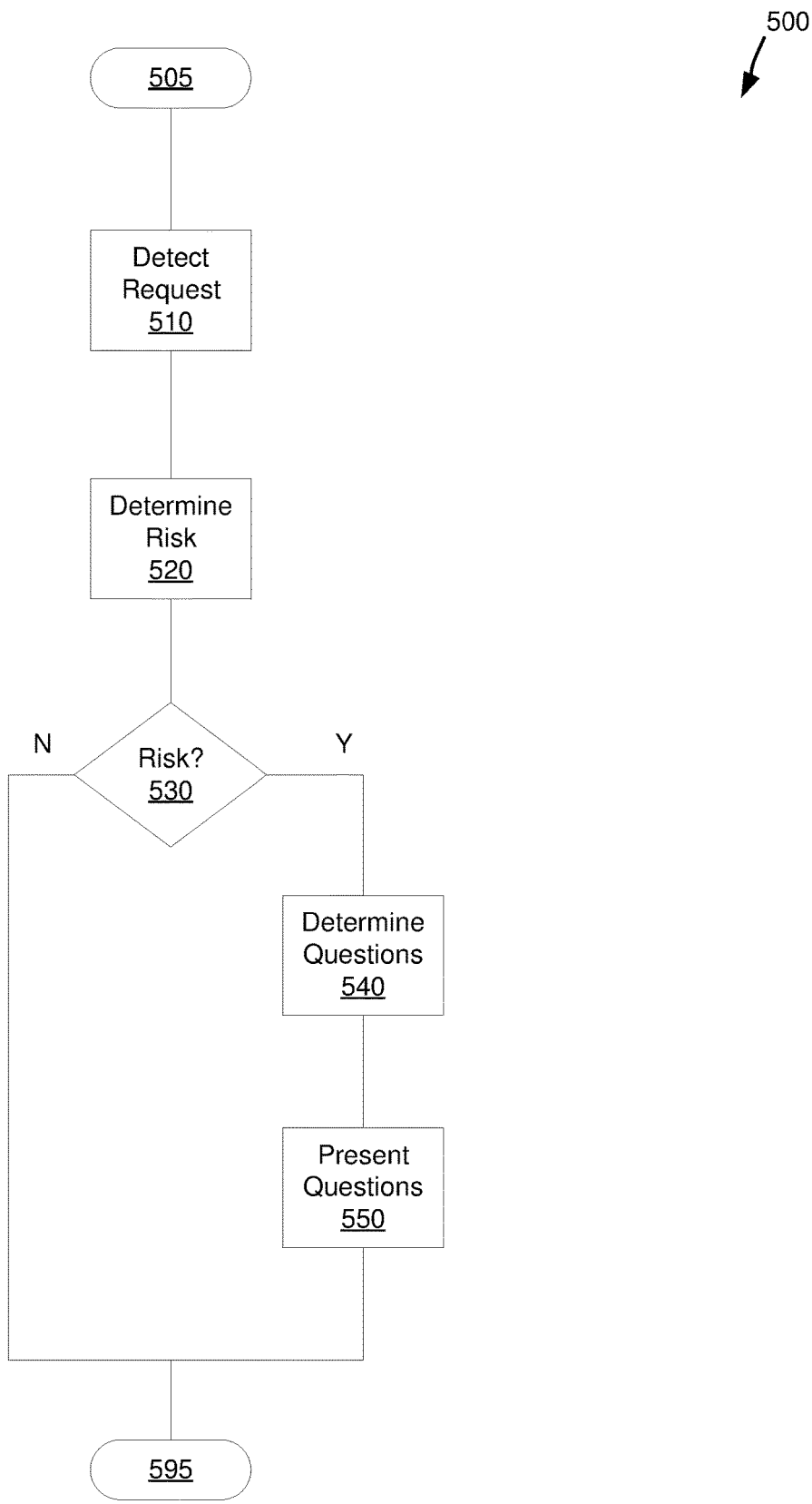
FIG. 5 depicts a method of authenticating and presenting questions to a resource request, consistent with some embodiments of the disclosure.

FIG. 5 depicts a method 500 of authenticating and presenting questions to a resource request, consistent with some embodiments of the disclosure. Method 500 may generally be implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.). In some embodiments, method 500 may be performed by a computing device, such as client 410, resource provider 420, or CTEA 450.

From start at 505, method 500 may begin by detecting a resource request at 510. The resource request may come from a client device, such as a laptop or smartphone of a user. The resource request may be detected by intercepting one or more packets or other network traffic that are directed at a resource provider, such as an online store. The resource request may include one or more factors or values that describe a user, such as a username and password, an email address, a particular item or service of object (e.g., a particular resource that the user is trying to obtain), and the like. The resource request may also include one or more parameters that describe the client device of the user, such as an IP address, a web browser type, a version of a software program, other information.

At 520 a risk of the request may be determined. The risk may be determined by attempting to identify a user that initiated the resource request. The identification may include comparing information related to the user or the client device of the resource request to a known untrusted entity database. For example, an untrusted entity database may contain user account information and/or device fingerprints of known malicious actors and bots. The identification may include scoring the request. In detail, a risk score may be calculated based on the request by analyzing the factors related to the user and the client device. The risk score may be higher if a request has relatively unlikely factors. For example, a risk score may increase if a request is directed to a relatively large quantity or amount of a particular item in comparison to the average quantity or amount of that particular item ordered by others. In another example, a risk score may be higher if a request has a shipping or billing address that does not match an address of a particular account that is associated with the request. In yet another example, a risk score may be higher if a request was attempting to use a virtual private credit card, and other transactions that are directed to the same item typically do not use a virtual private credit card.

If a risk is identified at 530:Y, then a set of questions may be determined at 540. The questions may be determined based on the risk score. For example, if a particular resource request includes a relatively high risk score, then a more difficult set of questions may be used as a pool to be chosen from. The more difficult questions may include geographical or time based components. The more difficult questions may require answers that are more natural language based. In another example, if a particular resource request includes a relatively low risk score, then a less difficult set of questions may be used as a pool to be chosen from. The less difficult questions may include general information, such as information that can be deduced by performing mathematical operations.

At 550 a question from the pool of questions may be presented to the client device that was the source of the request. The questions may be presented randomly to a user. For example, a question may be selected from a pool of questions that were selected or generated for a particular risk score, the score that was generated at 540. The question may be presented based on predetermined time periods. The predetermined time periods may be scaled depending on the risk score. For example, a higher risk score of a particular request may be given a correspondingly smaller amount of time (e.g., seconds, tenths of a second) for allowing an answer to a presented question. After a question is presented at 550, or if a risk a risk was not identified at 530:N, method 500 may end at 595.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   detecting, by a computing device, a resource request that is directed to a first online resource of a resource provider;
   identifying, based on the resource request, a first user that initiated the resource request;
   calculating, based on the resource request, a risk score of the first user, where the risk score determines a level of difficulty of a challenge question presented to the first user;
   determining, in response to the resource request and a high risk indicated by the risk score of the first user, to randomly select a high risk question from a set of challenge questions with answers,
   wherein the answers of the set of challenge questions are generated by:
      obtaining one or more public records maintained by one or more government agencies using a profile of the first user,
      obtaining a current location of the first user from a first client device of the first user, and
      generating the answers to coordinate the current location of the first user with one or more details in the one or more public records using a natural language processor to analyze the one or more public records and identify the answers from the one or more public records that correlate to the current location of the first user; and
   presenting, to the first client device of the first user, a first challenge question of the set of challenge questions.

2. The method of claim 1, wherein the identifying the first user comprises:
   comparing the resource request to an untrusted entity database of a plurality untrusted entities, and
   determining the resource request matches one or more untrusted entities of the plurality of untrusted entities.

3. The method of claim 1, wherein the resource request is initiated from the first client device of the first user.

4. The method of claim 3, wherein the risk score is based on an Internet Protocol address of the first client device.

5. The method of claim 3, wherein the risk score is based on a version of a software program executing on the first client device.

6. The method of claim 1, wherein the risk score is based on a factor selected from the group consisting of a shipping address of the first user, a payment method of the first user.

7. The method of claim 1, wherein the risk score is based on a speed that one or more fields related to the first online resource are filled out at the resource provider.

8. The method of claim 1, wherein the determining the set of challenge questions further comprises:
   setting, in response to determining the risk score is above a first risk threshold, a first period of time for presenting challenge questions to the first client device.

9. The method of claim 8, wherein the determining the set of challenge questions further comprises:
   setting, in response to determining the risk score is above a second risk threshold that is greater than the first risk threshold, a second period of time for presenting challenge questions to the first client device, wherein the second period of time is shorter than the first period of time.

10. The method of claim 9, wherein the determining the set of challenge questions further comprises:
    setting, in response to determining the risk score is above a third risk threshold that is greater than the second risk threshold, a third period of time for presenting challenge questions to the first client device, wherein the third period of time is shorter than the second period of time.

11. The method of claim 1, wherein the set of challenge questions include details of a geographical area that surrounds the first user.

12. The method of claim 1, wherein the answers for the set of challenge questions are generated prior to the detecting of the resource request directed to the first online resource of the resource provider.

13. A system, the system comprising:
    a memory, the memory containing one or more instructions; and
    a processor, the processor communicatively coupled to the memory, the processor, in response to reading the one or more instructions, configured to:
       detect, by a computing device, a resource request that is directed to a first online resource of a resource provider;
       identify, based on the resource request, a first user that initiated the resource request;

calculate, based on the resource request, a risk score of the first user, where the risk score determines a level of difficulty of a challenge question presented to the first user;

determine, in response to the resource request and a high risk indicated by the risk score of the first user, to randomly select a high risk question from a set of challenge questions with answers, wherein the answers of the set of challenge questions are generated by:
  obtaining one or more public records maintained by one or more government agencies using a profile of the first user,
  obtaining a current location of the first user from a first client device of the first user, and
  generating the answers to coordinate the current location of the first user with one or more details in the one or more public records using a natural language processor to analyze the one or more public records and identify the answers from the one or more public records that correlate to the current location of the first user; and present, to the first client device of the first user, a first challenge question of the set of challenge questions.

14. The system of claim 13, wherein the identifying the first client comprises:
  comparing the resource request to an untrusted entity database of a plurality untrusted entities, and
  determining the resource request matches one or more untrusted entities of the plurality of untrusted entities.

15. The system of claim 13, wherein the identifying the first client comprises:
  calculating, based on the resource request, a risk score of the first user.

16. A computer program product, the computer program product comprising:
  one or more computer readable storage media; and
  program instructions collectively stored on the one or more computer readable storage media, the program instructions configured to:
    detect, by a computing device, a resource request that is directed to a first online resource of a resource provider;
    identify, based on the resource request, a first user that initiated the resource request;
    calculate, based on the resource request, a risk score of the first user, where the risk score determines a level of difficulty of a challenge question presented to the first user;
    determine, in response to the resource request and a high risk indicated by the risk score of the first user, to randomly select a high risk question from a set of challenge questions with answers,
    wherein the answers of the set of challenge questions are generated by:
      obtaining one or more public records maintained by one or more government agencies using a profile of the first user,
      obtaining a current location of the first user from a first client device of the first user, and
      generating the answers to coordinate the current location of the first user with one or more details in the one or more public records using a natural language processor to analyze the one or more public records and identify the answers from the one or more public records that correlate to the current location of the first user; and
    present, to the first client device of the first user, a first challenge question of the set of challenge questions.

17. The computer program product of claim 16, wherein the identifying the first client comprises:
  comparing the resource request to an untrusted entity database of a plurality untrusted entities, and
  determining the resource request matches one or more untrusted entities of the plurality of untrusted entities.

* * * * *